United States Patent
Masse et al.

[11] Patent Number: 6,011,671
[45] Date of Patent: *Jan. 4, 2000

[54] HEAD GIMBAL ASSEMBLY FOR LIMITING DIMPLE SEPARATION FOR A DATA STORAGE DEVICE

[75] Inventors: Robert W. Masse, Rosemount; Richard August Budde, Plymouth; Brian Dean Hammel, Eagan, all of Minn.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/864,154

[22] Filed: May 28, 1997

Related U.S. Application Data

[60] Provisional application No. 60/043,153, Apr. 10, 1997.

[51] Int. Cl.⁷ .................................................. G11B 5/48
[52] U.S. Cl. .................................................. 360/104
[58] Field of Search ........................................ 360/104

[56] References Cited

U.S. PATENT DOCUMENTS

| | | | |
|---|---|---|---|
| 4,286,297 | 8/1981 | Root et al. | 5/48 |
| 4,422,115 | 12/1983 | Spash | 5/48 |
| 4,616,279 | 10/1986 | Poorman | 15/64 |
| 4,786,999 | 11/1988 | Tanaka et al. | 5/49 |
| 4,829,395 | 5/1989 | Coon et al. | 5/49 |
| 4,853,811 | 8/1989 | Brooks et al. | 5/60 |
| 4,991,045 | 2/1991 | Oberg et al. | 5/49 |
| 5,001,583 | 3/1991 | Matsuzaki | 5/48 |
| 5,006,946 | 4/1991 | Matsuzaki | 5/48 |
| 5,008,768 | 4/1991 | Carlson et al. | 5/48 |
| 5,063,464 | 11/1991 | Astheimer et al. | 5/60 |
| 5,115,363 | 5/1992 | Khan et al. | 5/60 |
| 5,355,267 | 10/1994 | Aoyagi et al. | 5/49 |
| 5,491,597 | 2/1996 | Bennin et al. | 5/54 |
| 5,526,205 | 6/1996 | Aoyagi | 5/48 |

FOREIGN PATENT DOCUMENTS

| | | | |
|---|---|---|---|
| 0 218 985 | 4/1987 | European Pat. Off. | 5/54 |
| 0 432 145 A2 | 6/1991 | European Pat. Off. | 5/55 |
| 32 02 577 A1 | 8/1982 | Germany | 5/55 |
| 57-167162 | of 1982 | Japan | 17/32 |

*Primary Examiner*—A. J. Heinz
*Attorney, Agent, or Firm*—Westman, Champlin & Kelly, P.A.

[57] ABSTRACT

An improved head gimbal assembly for supporting a head in a disc drive assembly. The improved head gimbal assembly including a gimbal spring adapted to support a slider and provide desired flexure characteristics for the slider to pitch and roll while limiting dimple separation. The gimbal spring including spaced struts formed of elongated straight members. The struts are shaped to define a generally increasing spring constant along a substantial length of the struts extending from a distance proximal of extended ends of the struts adapted to support a slider to opposed ends of the struts.

19 Claims, 6 Drawing Sheets

FIG. 7B

HEAD GIMBAL ASSEMBLY FOR LIMITING DIMPLE SEPARATION FOR A DATA STORAGE DEVICE

CROSS-REFERENCE TO RELATED APPLICATION

This application claims priority to Provisional Application, Ser. No. 60/093/53, filed Apr. 10, 1997 and entitled "AN OPTIMIZED FLEXURE FOR A HEAD GIMBAL ASSEMBLY".

BACKGROUND OF THE INVENTION

The present invention relates to a disc drive storage system. In particular, the present invention relates to an improved head gimbal assembly which reduces gimbal separation from the load arm which may result from operating shock or shocks introduced during shipping and handling.

Disc drives are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces.

An actuator mechanism moves the sliders from track to track across the surfaces of the discs under control of electronic circuitry. The actuator mechanism includes a track accessing arm and a suspension for each disc head slider. The suspension includes a load beam and a gimbal spring. The load beam provides a preload force which forces the slider toward the disc surface. The gimbal spring and load beam may be formed of separate members coupled for operation or may be integrally formed.

The slider includes an air bearing surface which faces the disc surface. As the disc rotates, the disc drags air under the slider along the air bearing surfaces in a direction approximately parallel to the tangential velocity of the disc. As the air passes beneath the air bearing surface, skin friction on the air bearing surface causes the air pressure between the disc and the air bearing surface to increase, which creates a hydrodynamic lifting force that causes the slider to lift and fly above the disc surface.

The preload force supplied by the load beam counteracts the hydrodynamic lifting force. The preload force and the hydrodynamic lifting force reach an equilibrium based upon the hydrodynamic properties of the slider and the speed of rotation of the disc. The slider preferably flies with a positive pitch in which the leading edge of the slider (or air bearing surface) flies at a greater distance from the disc surface than the trailing edge. This ensures that the transducer, which is typically carried at the trailing edge, remains close to the disc surface and provides a stable fly height profile across the disc surface.

Typically, the suspension includes a load dimple defining a load and pivot point for the system. The load force is supplied to the slider by the load beam through the load dimple. The load dimple also provides a pivot point for the slider to pitch and roll relative to the disc surface. The slider is supported by the gimbal spring which typically includes struts which cooperatively support the slider for movement relative to the load dimple.

As previously explained, the gimbal spring and load beam may be formed of separate members or integrally formed. The load beam and gimbal spring are flexibly coupled to one another for movement of the gimbal spring relative to the load beam to facilitate the desired fly; and the desired pitch and roll characteristics. During operation or shipping and handling, the gimbal spring may deflect or move relative to the load beam. Movement of the gimbal spring relative to the load beam or arm causes separation of the slider supported by the gimbal spring and load arm, thus affecting the performance characteristics of the head. Thus, it is desirable to design a gimbal spring that facilitates the desired pitch and roll characteristics of a slider supported thereby, while restricting movement of the spring relative to a load arm to reduce separation between the load arm and slider, which may be referred to as dimple separation.

SUMMARY OF THE INVENTION

The present invention relates to a suspension system for a disc head slider for supporting the slider relative to the disc surface to read and write data from the disc surface. The suspension system includes a gimbal spring adapted to support a slider to pitch and roll relative to the disc surface. The gimbal spring includes spaced struts formed of elongated straight members, which are shaped to define a generally increasing spring constant along a substantial length of the struts extending from a distance proximal of extended ends of the struts adapted to support a slider to opposed ends of the struts to limit dimple separation.

It should be understood that the above-referenced Figures are for illustration and are not necessarily drawn to scale.

DETAILED DESCRIPTION OF THE PREFERRED EMBODIMENTS

Figure 1:
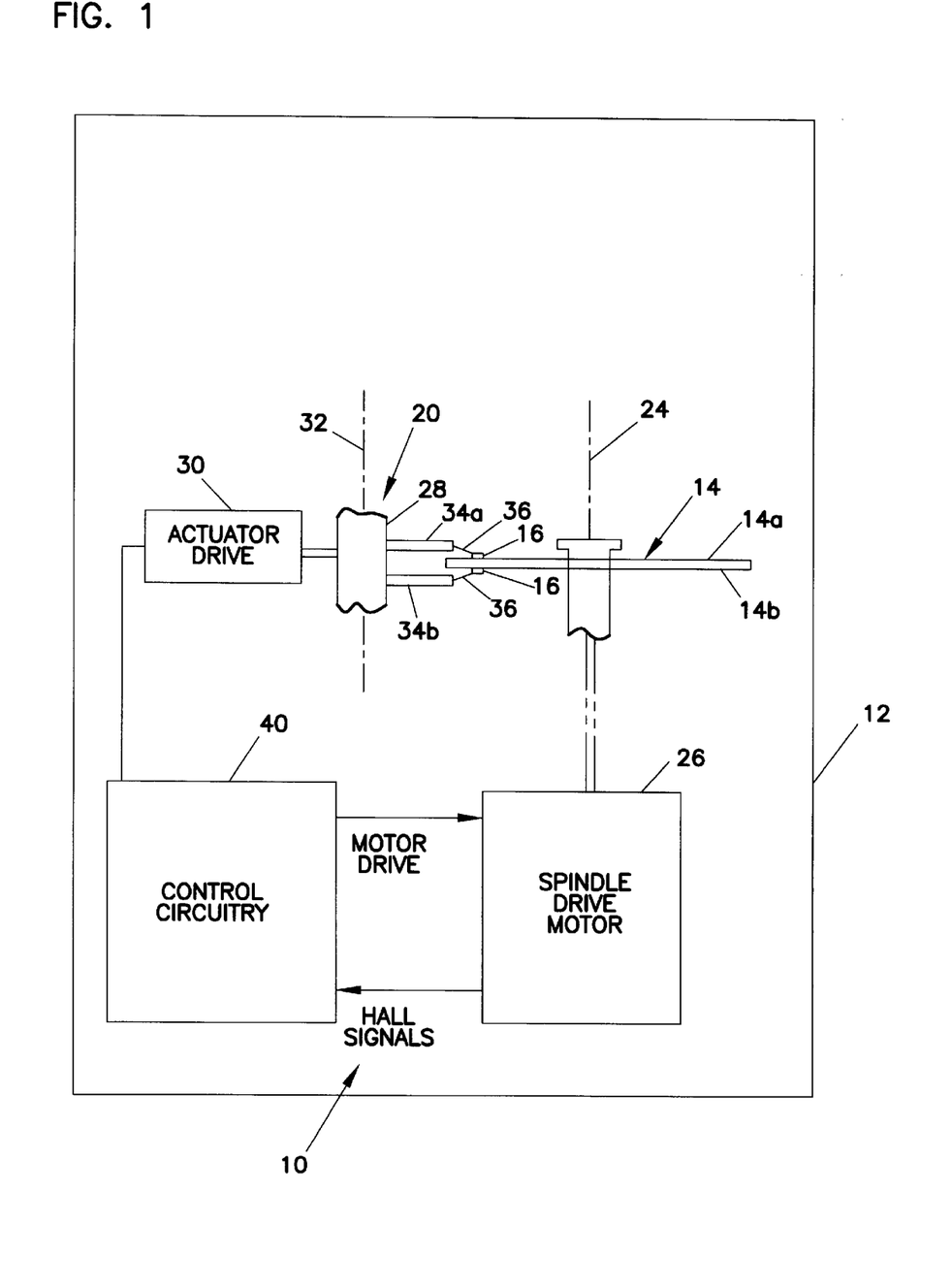
FIG. 1 is a schematic view illustrating operation of a disc drive.

FIG. 1 is a schematic view illustrating a disc drive 10. As shown, disc drive 10 includes a housing 12 (shown schematically), disc 14, and a plurality of head gimbal assemblies (HGA) 16, which are supported relative to disc 14 and actuated by actuator assembly 20. The disc 14 is supported for rotation about spindle axis 24 by a spindle motor 26. The head gimbal assemblies 16 support a disc head slider via a gimbal spring (not shown) for reading and writing information to upper and lower disc surfaces 14a–14b in a known manner. Although a single disc 14 is shown, the disc drive 10 may include a plurality of discs 14 supported for co-rotation about spindle axis 24.

The actuator assembly 20 includes an actuator block 28 and actuator drive 30. Actuator block 28 is rotationally coupled to housing 12 for operation about a pivot axis 32 in a known manner. A plurality of spaced stacked actuator arms 34a–b extend from the actuator block 28 in alignment with upper and lower disc surfaces 14a and 14b. The HGAs 16 are coupled to actuator arms 34a–b via load beams 36. As shown, actuator arm 34a supports HGA 16 in alignment with an upper disc surface 14a, and actuator arm 34b supports HGA 16 in alignment with a lower disc surface 14b. Actuator drive 30, which is typically a voice coil motor, pivots actuator block 28 about the pivot axis 32 for alignment with selected data tracks of disc 14. Operation of the spindle motor 26 and actuator drive 30 are controlled via control circuitry 40 of disc drive 10. For a multidisc drive, additional actuator arms 34 are included to support HGA 16 relative to a plurality of discs 14.

Figure 2A:
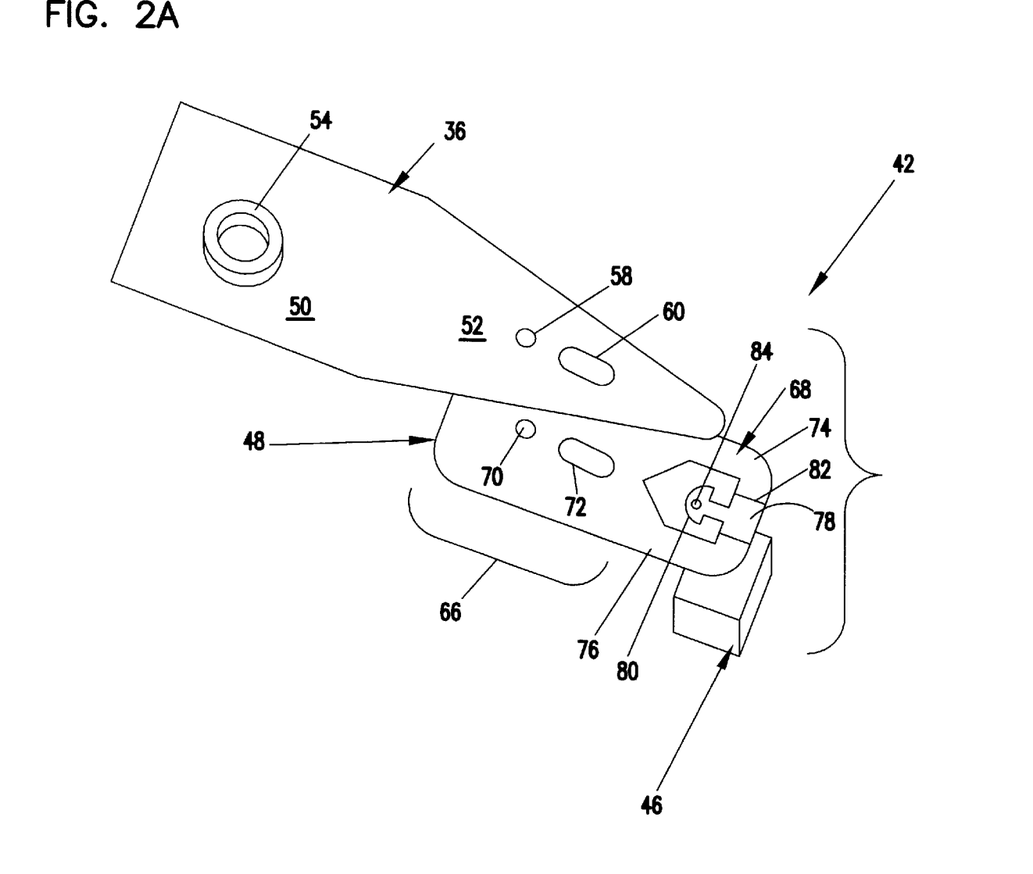
FIG. 2A is an exploded view of a suspension assembly for a disc head.
Figure 2B:
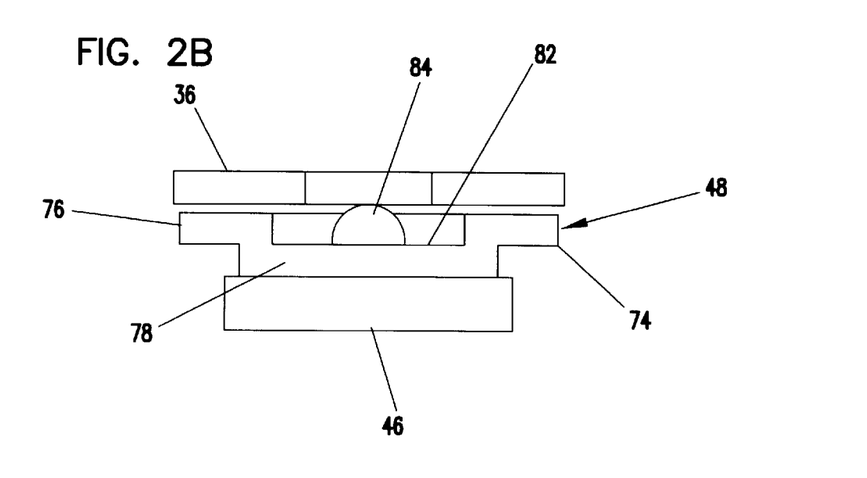
FIG. 2B is an end view of an assembled suspension assembly of FIG. 2A.

Discs 14 are rotated to create a hydrodynamic lifting force to lift the head gimbal assemblies 16 to fly above the disc surfaces for operation to read and write data in a known manner. FIGS. 2A–2B illustrate an embodiment of a suspension system 42 including load beam 36 and head gimbal assembly 16 of the present invention. The head gimbal assembly 16 includes a slider 46 and a gimbal spring 48. The slider 46 is designed to fly above a disc surface via cooperation of a lower air bearing surface of the slider 46 which faces the disc surface 14a or 14b. An upper surface of the slider 46 is operably coupled to gimbal spring 48 to support slider 46 to fly above the disc surface in a known manner. The slider 46 supports transducers (not shown) for reading and writing data to disc surfaces 14a, 14b.

Load beam 36 is coupled to actuator arms 34a, 34b, shown in FIG. 1, and generally comprises an attachment portion 50 and a tapered flexible portion 52 defining a load arm. Attachment portion 50 includes a swaging ring 54 for attachment of the load beam 36 to actuator arm 34a, 34b by known swaging techniques. As shown, the load beam 36 includes alignment holes 58, 60 for accurately assembling the components of the disc drive in a known manner.

The gimbal spring 48 is formed of an elongated flexible member which is designed to support the slider 46 to pitch and roll to follow the topography of the disc surface. The gimbal spring 48 generally includes an attachment portion 66 and a spring portion 68. The elongated attachment portion 66 includes alignment holes 70, 72. The gimbal spring 48 is coupled to the load beam 36 along the attachment portion 66 and the spring portion 68 is cantilevered therefrom. Preferably, the gimbal spring 48 is coupled to the load beam 36 by an adhesive in a known manner. Alignment holes 58, 60 of the load beam 36 align with holes 70, 72 of the gimbal spring 48.

The spring portion 68 includes struts 74, 76, cross beam 78, and slider tab 80. Struts 74, 76 are essentially elongated straight members and extend essentially from attachment portion 66 in an opposed spaced relationship to define a gap therebetween. Cross beam 78 connects extended ends of struts 74, 76. The slider tab 80 is supported by cross beam 78 and extends into the gap. The slider 46 is mounted to the slider tab 80 and is flexibly supported thereby relative to the disc surface.

As shown in FIG. 2B, cross beam 78 has a recessed portion 82 from which the slider tab 80 extends to support slider tab 80 in a slightly recessed plane, from the remaining spring portion. Dimple 84 extends from an upper surface of slider tab 80 toward the load beam 36. Slider 46 is coupled to a lower surface of tab 80. An end portion of load beam 36 is aligned with dimple 84 on slider tab 80 to supply a preload force to the slider for controlling the fly height of the slider 46. Dimple 84 also defines a pivot point about which the slider 46 pitches and rolls. Thus, the gimbal spring 48 supports the slider 46 for movement about the pivot point defined by dimple 84.

As previously explained, a portion (attachment portion 66) of the gimbal spring 46 is fixedly secured to the load arm and a portion (spring portion 68) is cantilevered from the load beam 36. The cantilevered attachment of the spring 48 to the load beam 36 defines a deflection or flexure position for the gimbal spring 48 relative to the load beam 36. If sufficient shock or force is applied to the spring portion 68 or slider 46 during operation or shipping and handling, the spring portion 68 may deflect relative to the load beam 36 and separate from the load beam 36, as comparatively illustrated in FIGS. 3A–3B.

Figure 3A:
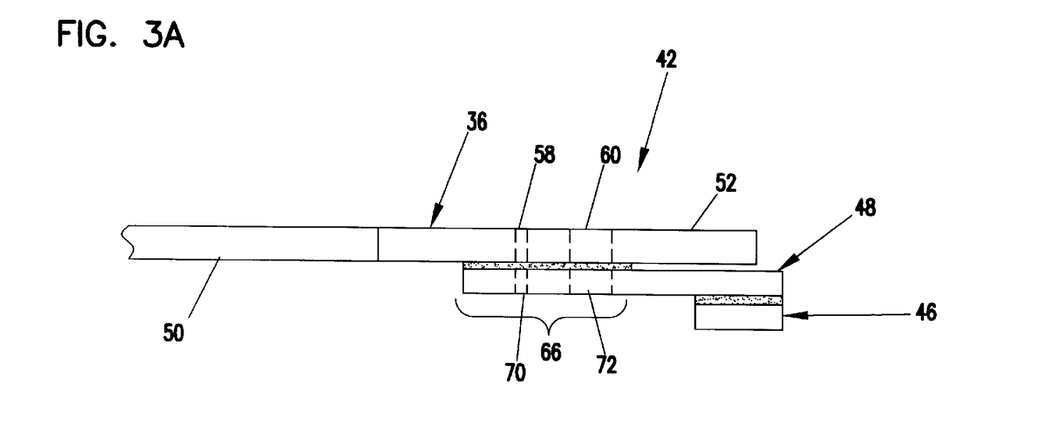
FIG. 3A is a side view of the assembled suspension assembly of FIGS. 2A–2B.
Figure 3B:
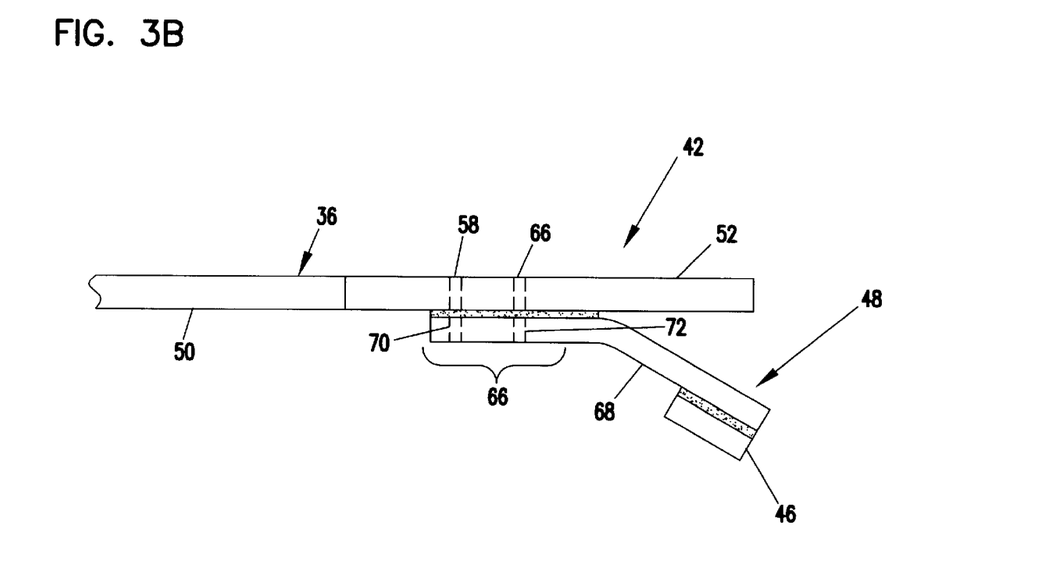
FIG. 3B is a side view of the assembled suspension assembly of FIG. 3A illustrating the gimbal spring supporting slider separated from the load beam.

FIG. 3A illustrates the suspension system 42 in a normal operating position. FIG. 3B illustrates the spring portion 68 separated from load beam 36. Separation of the load beam and spring degrades operation of the head to read and write data to disc 14. In particular, in the embodiment shown in FIGS. 2A–2B, dimple 84 on gimbal spring 48 separates from the load arm to degrade the gimballing action of the spring.

Figure 4:
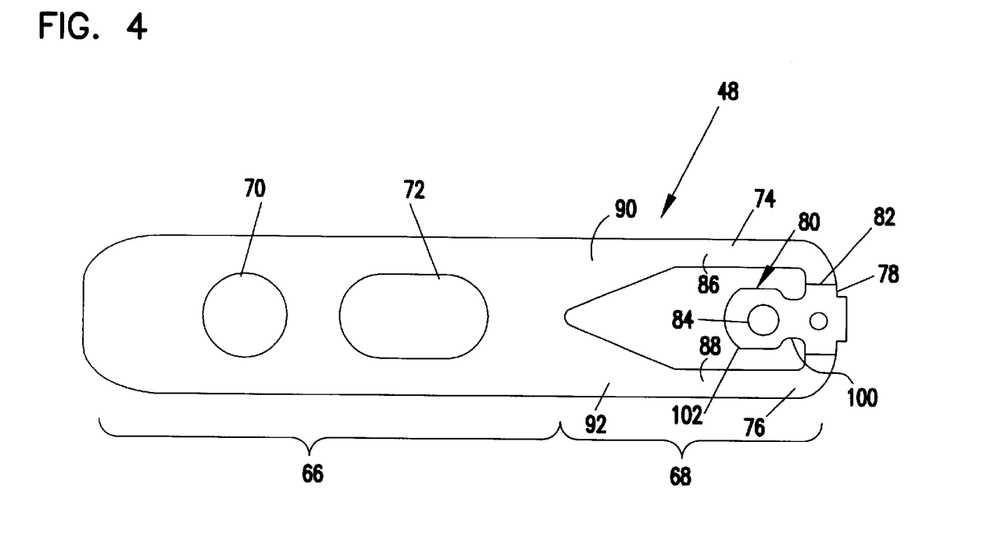
FIG. 4 is a top plan view of an embodiment of a gimbal spring according to the present invention.

As shown in FIG. 4, in an embodiment of the gimbal spring 48 of the present invention, struts 74, 76 include elongated arm portions 86, 88, and stem portions 90, 92. Ends of the stem portions 90, 92 are generally coupled to the attachment portion 66, and the arm portions 86, 88 extend from the stem portions 90, 92. Arm portions 86, 88 are formed of elongated members having a generally uniform width which extend in spaced essentially straight relation. Arm portions 86, 88 support cross beam 78 and extend a sufficient distance and have a width that provides sufficient spring flexure to allow the slider to pitch and roll as desired about the pivot point.

The stem portions 90, 92 are shaped to provide an increasing spring constant along the length thereof to limit the vertical movement of the spring portion 68 relative to the load beam 36. In particular, the width of the stem portions 90, 92 is gradually widened along the entire length thereof proximal of arm portion 86, 88 to increase the resistance of the spring portion 68 to limit the deflection of the spring portion 68 relative to load beam 36. Although, as illustrated the spring constant of struts 74, 76 is varied by varying the width of struts, variation of the spring constant is not limited to varying the width of the struts 74, 76 and other dimensions may be varied.

The struts 74, 76 generally extend from the attachment position of the gimbal spring 48 and the load beam 36 along the extent of the spring portion 68. Preferably, the stem portions 90, 92 extend generally from the deflection or flexure position at the attachment position of the spring 48 to load beam 36 along at least 25 percent of the length of the struts 74, 76 to provide sufficient flexure limitation. The arm portions 86, 88 extend along the remaining length to support the slider 46. Preferably, as shown in FIG. 4, stem portions 90, 92 of struts 74, 76 are generally tapered along the length thereof so that stem portion 90 converges towards stem portion 92 to form a "V" shaped gap therebetween. Arm portions 86, 88 form a generally rectangular shaped gap into which tab 80 extends.

Preferably, the length of the arm portions 86, 88 is 0.051 inches to cross beam 78; and the length of the stem portions 90, 92 is approximately 0.045 inches. The width of arm portions 86, 88 is approximately 0.011 inches. The width of the stem 90, 92 at a first end proximate to the deflection or flexure position is approximately 0.0315 inches (the width of the first ends of both stem portions 90, 92 approximates the width of the spring 48), and the width at a second extended end is approximately 0.0205 inches.

Thus, the width of the stem portions 90, 92 at the first end is approximately 1.5 times as wide as the second end to limit the vertical flexure of the spring portion 68 from the load beam to reduce or minimize dimple 84 separation on tab 80 from the load beam 36. Preferably, the extent of the stem portions 90, 92 is approximately 45 percent of the total length of struts 74, 76. Although the preferred length of the embodiment illustrated in FIG. 4 is approximately 45 percent, the invention is not so limited as long as the extent of the stem portion 90, 92 is substantial in combination with the magnitude of the spring constant along the length of stem portion 90,92 to sufficiently limit dimple separation. A substantial extent is at least approximately 25 percent of the length of the strut 74, 76 in combination with an increasing spring constant of sufficient magnitude to limit dimple separation.

Slider tab 80, as shown in FIG. 4, is supported relative to cross beam 78 and extends into the gap between arm portions 86, 88. The slider tab 80 is formed of a narrow neck portion 100 and a main portion 102. The neck portion 100 extends from cross beam 78 to support main portion 102. Dimple 84 extends from an upper surface of the main portion 102 in alignment with load beam 36. Slider 46 is secured to a lower surface of the main portion 102 and neck 100 via an adhesive or other known methods.

Slider 46 is preferably formed of a ceramic material, and the tab 80 is preferably formed of a stainless steel material, thus the slider 46 and tab 80 have different thermal expansion rates. The width of the neck 100 is narrower than the main portion 100, and the main portion 102 has a relatively small size sufficient to accommodate dimple 84. The reduced size of neck 108 and main portion 102 reduces the surface area of tab 80. Since the surface area of tab 80 is reduced, the attachment area of the slider tab 80 and slider 46 is reduced, thus reducing the extent of relative movement between the slider 46 and tab 80 as a result of the differences in the thermal expansion rates between slider 46 and tab 80. Preferably, the width of the neck portion 100 is approximately 0.016 inches, and the width of the main portion 102 is approximately 0.024 inches. Preferably, the length of tab 80 is approximately 0.032 inches from the cross beam 78.

Figure 5:
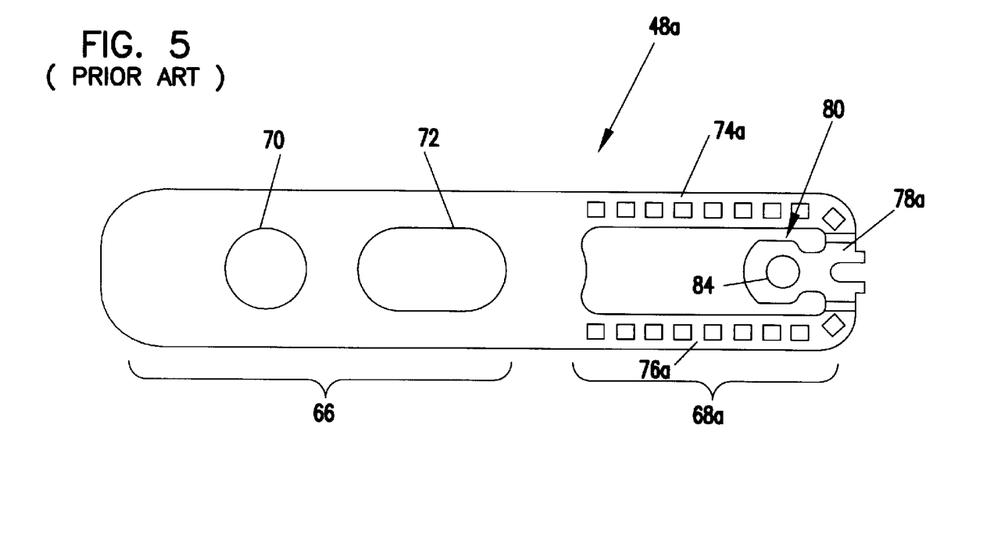
FIG. 5 is a top plan view of a prior art gimbal spring.

Various shocks introduced during operation or during shipping may cause dimple separation from the load beam via separation of the load beam from the gimbal spring about the flexure position. The gimbal spring of the present invention is designed to reduce the propensity of the gimbal spring to separate from the load beam. Performance of the gimbal spring of the present invention was compared to prior art gimbal springs, and it was found that the gimbal spring of the present invention was able to withstand higher shock loads with lower dimple separation than previous gimbal spring designs. The gimbal spring of the present invention also exhibits desired pitch and roll characteristics and improved sway mode frequency and flying characteristics. FIG. 5 illustrates a gimbal spring 48a of the prior art where like numbers in FIG. 5 refer to like parts in FIG. 4. As shown in FIG. 5, the struts 74a, 76a do not include stem portions having an increasing spring constant along the length thereof to limit flexure between the gimbal spring and load beam.

Figure 6A:
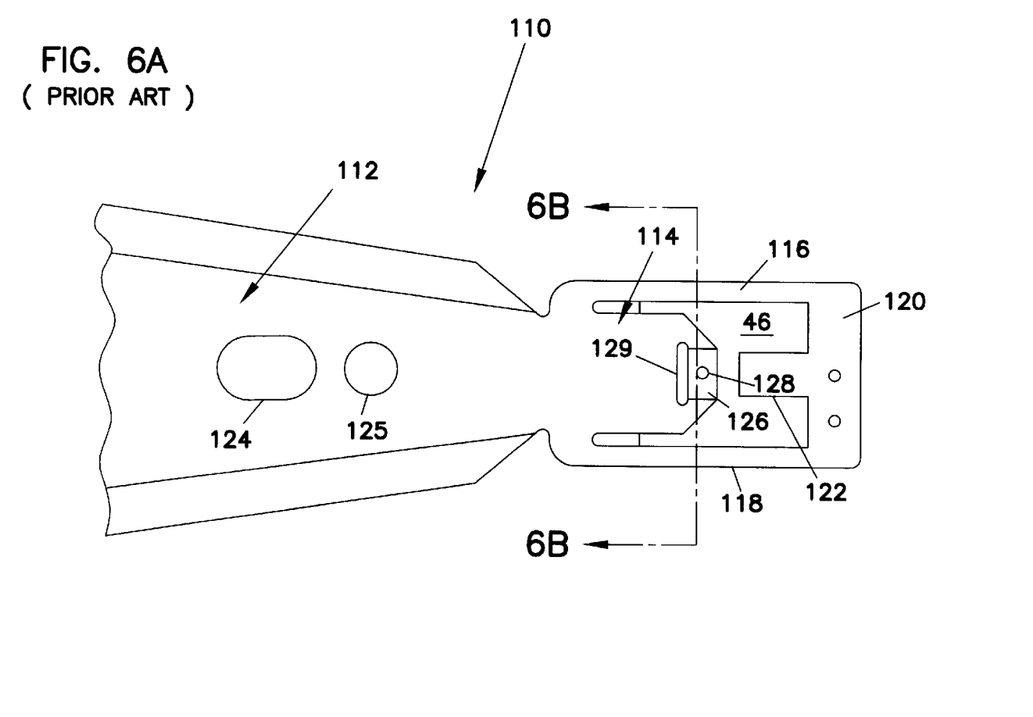
FIG. 6A is a top plan view of a prior art in-spring gimbal.
Figure 6B:
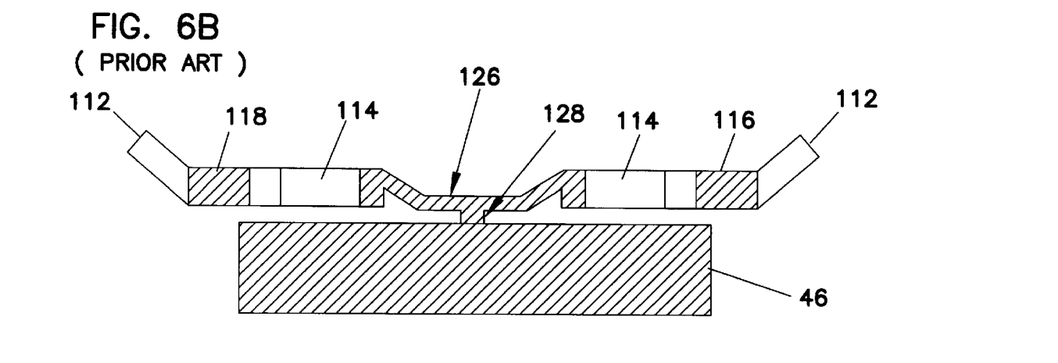
FIG. 6B is a cross-sectional view taken along line 6B—6B of FIG. 6A.

The suspension assembly illustrated in FIGS. 2–4 relates to a suspension assembly which includes a separate load beam 36 and gimbal spring 48. Alternate suspension systems are known where the load beam and gimbal spring are integrally formed from a unitary member to define a single structural unit, commonly referred to as an "in-spring gimbal". FIGS. 6A–6B illustrate an in-spring gimbal 110 of the prior art. As shown, the in-spring gimbal 110 is formed of a unitary structure having an elongated flexure arm 112, a load arm 114, struts 116 and 118, cross beam 120, and slider mounting tab 122.

The elongated flexure arm 112 includes alignment holes 124, 125, which are used for assembling components of the disc drive. The elongated flexure arm 112 is supported by actuator arms 34a or 34b. The struts 116, 118 and load arm 114 extend, essentially, from an extended end of the elongated flexure arm 112 and are formed integrally therewith. The struts 116 and 118 are spaced to define a gap therebetween. The load arm 114 is positioned in the gap between struts 116, 118. As shown in FIG. 6B, the load arm 114 includes a recessed portion 126 having a dimple 128 formed thereon to form the load point for applying a preload force to slider 46 and defining a pivot point about which the slider 46 pitches and rolls. Preferably, dimple 128 is formed by etching a portion of the lower surface of the load arm 114 about the dimple 128 and forming a recessed portion 126 on an upper surface of the load arm 114 to extend dimple 128 for engaging slider 46. Preferably, the recessed portion 126 may be press-formed as facilitated by opening 129 by known manufacturing techniques.

The cross beam 120 extends from extended ends of struts 116 and 118 to connect the extended ends of struts 116, 118. The slider mounting tab 122 is supported by the cross beam 120 and extends toward load arm 114 within the gap defined between struts 116, 118. Slider 46 is coupled to the in-spring gimbal 110 via tab 122 such that the struts 116 and 118 allow the slider supported by tab 122 to pitch and roll relative to the load point defined by dimple 128. Load arm 114 supplies a preload force through dimple 128 to the slider supported by tab 122.

Figure 7A:
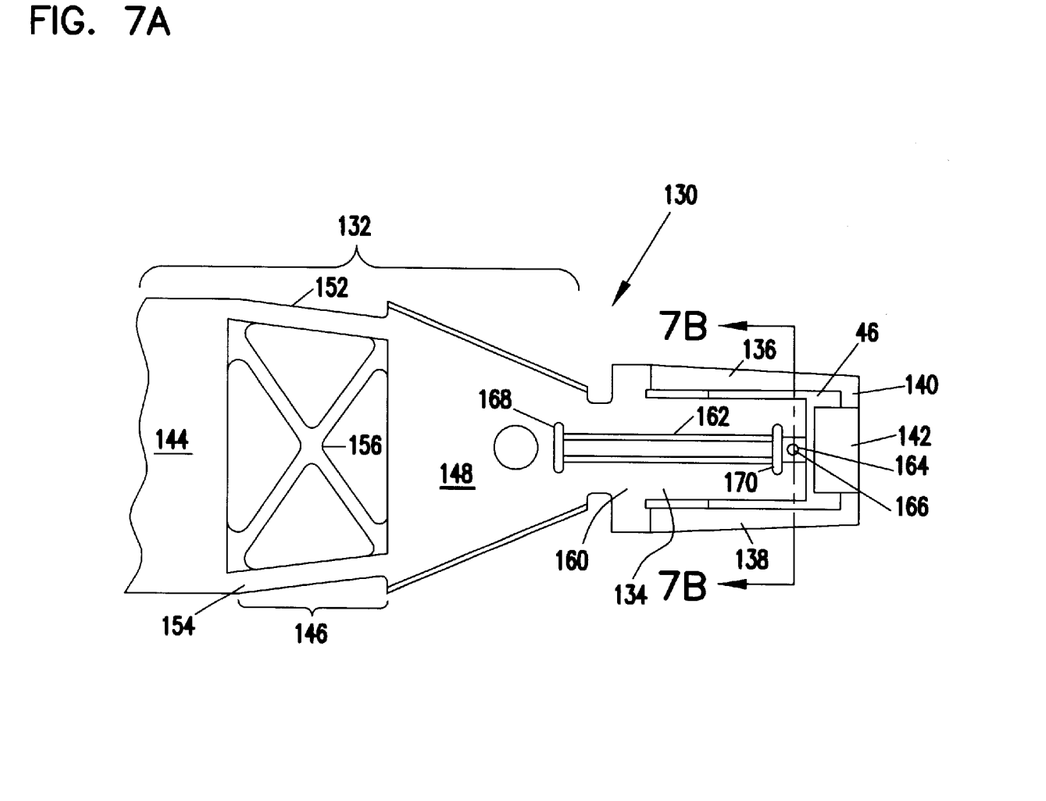
FIG. 7A is a top plan view of an embodiment of an in-spring gimbal according to the present invention.
Figure 7B:
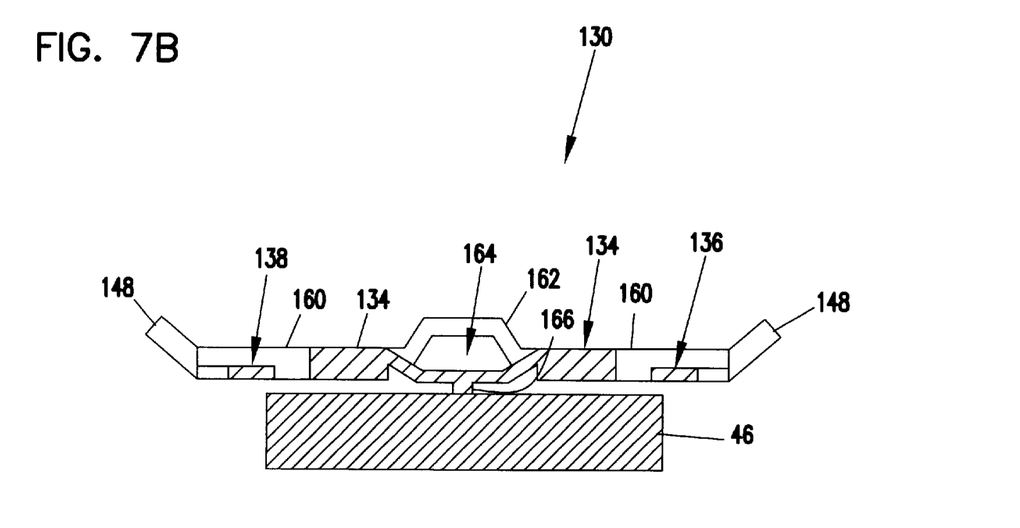
FIG. 7B is a cross-sectional view taken along line 7B—7B of FIG. 7A.

FIGS. 7A–7B illustrate an improved in-spring gimbal 130 of the present invention. As shown, the in-spring gimbal 130 includes a flexure arm 132, a load arm 134, struts 136 and 138, cross beams 140, and slider mounting tab 142. Flexure arm 132 is secured to actuator arms 34a, 34b. In particular, flexure arm 132 includes attachment portion 144 (partially shown), intermediate portion 146, and tapered portion 148.

The attachment portion 144 includes a swaging ring (not shown) for securing the in-spring gimbal 130 to the actuator arms 34a, 34b for operation. The intermediate portion 146, tapered portion 148, and load arm 134 generally form a load beam for supplying a load force to slider 46 supported by in-spring gimbal 130. As shown, the intermediate portion 146 is formed of spaced beams 152, 154, preferably reinforced by cross beams 156 to provide a relatively flexible structure. The struts 136, 138; cross beam 140; and tab 142 form the spring for flexibly supporting slider 46 to pitch and roll.

A spring/load support 160 extends from the tapered portion 148 and is integrally formed therewith. The spring/load support 160 integrally supports an extended center portion and extended spaced arms in straight alignment with the center portion to form load arm 134 and struts 136 and 138, respectively. Extended ends of the struts 136, 138 are connected by cross beam 140, which supports the slider mounting tab 142. Thus, as described, struts 136, 138 support slider 46 to pitch and roll relative to the disc surface. Load arm 134 and struts 136, 138 are independently cantilevered from the spring/load support 160 and may deflect relative to one another at a flexure or deflection position defined by the spring/load support 160.

The load arm 134 includes a raised stepped portion 162 to form an I-beam like structure and a recessed portion 164 supporting dimple 166. The dimple 166 defines the load point through which load arm 134 applies a preload force to slider 46 and a pivot point for the slider to pitch and roll about. Dimple 166 is formed similar to the process described for forming dimple 128 in the embodiment illustrated in FIGS. 6A–6B.

The raised stepped portion 162 extends along the center of the load arm 134 and controls the amount of deflection under preload and increases the stiffness of the load arm 136 to increase the vibration frequency of the load arm for optimizing reading and writing characteristics.

As shown, struts 136, 138 are tapered between the extended ends at cross beam 140 and the cantilevered position at spring/load support 160. Since the width of struts 136, 138 is tapered, the struts are more flexible proximate to the load point to allow the slider 46 to pitch and roll relative to the load point. The width of the struts 136, 138 increases along the length thereof to the spring/load support 160 to increase the spring constant of the struts 136, 138 toward the flexure position of the struts 136, 138 to limit the flexure or movement of the struts 136, 138 relative to the load arm 134 to reduce dimple separation.

Preferably, the unitary in-spring gimbal 130 is formed of a sheet of stainless steel material having a uniform thickness. The sheet of material is stamped to form the features of the in-spring gimbal 130. Opposed legs formed by the stamping process are etched to reduce the thickness thereof to form struts 136, 138 having a thickness less than the thickness of the uniform structure and load arm 134. The cross beam 140 is also stamped and then etched. Raised portion 162 on load arm 134 is press-formed on a center portion of the stamped stainless steel sheet. Openings 168, 170 at opposed ends of the raised portion 162 facilitate formation of the raised portion 162.

The etched struts 136, 138 provide sufficient flexibility for the slider supported by the slider mounting tab 142 to pitch and roll about a load point. Additionally, the tapered width of the struts between the extended ends of the struts and the spring/load support 160 provides sufficient rigidity to limit deflection of the struts 136, 138 relative to load arm 134 to reduce dimple separation. The length of struts 136, 138 is 0.10 inches (length to the cross beam 14). The width of struts 136, 138 at spring/load support 160 is 0.015 inches and at extended ends is 0.01 inches. Preferably, the thickness of the struts 136, 138 is 0.001 inches.

Although the present invention has been described with reference to preferred embodiments, workers skilled in the art will recognize that changes may be made in form and detail without departing from the spirit and scope of the invention.

What is claimed is:

1. A suspension adapted for supporting a disc head slider comprising:
   a disc head slider;
   a gimbal means operably coupled to a load member and disc head slider for limiting dimple separation between the load member and disc head slider.

2. The suspension of claim 1 wherein the gimbal means includes tapered gimbal arms for limiting dimple separation.

3. The suspension of claim 2 wherein a width of the gimbal arms is tapered along a portion of the length thereof.

4. The suspension of claim 3 wherein the width of the gimbal arms are tapered along at least 25% of the length of the gimbal arms.

5. The suspension assembly of claim 3 wherein the width of the gimbal arms are tapered along the entire length of the gimbal arms.

6. The suspension assembly of claim 3 wherein the width of the gimbal arms are tapered along outer edges of the gimbal arms.

7. The suspension assembly of claim 3 wherein the width of the gimbal arms are tapered along inner edges of the gimbal arms.

8. The suspension of claim 7 wherein the tapered inner edges of the gimbal arms converge to form a V-shaped gap between gimbal arms.

9. The suspension assembly of claim 2 wherein the gimbal arms support a slider mounting tab having a narrow neck portion supporting a main portion.

10. An in-spring gimbal assembly comprising:
    a load beam including a load arm having an extended end adapted to supply a load force;
    gimbal spring including:
    gimbal arms having extended ends;
    a slider support coupled to extended ends of the gimbal arms; and
    the load arm and each gimbal arm being connected to a base of the load beam and the load arm extending in longitudinal alignment with the gimbal arms and having sufficient length to supply a load force through the extended end of the load arm to a slider supported by the slider support, each gimbal arm having a stem connected to the base of the load beam at spaced locations on opposed sides of the load arm, an outer profile dimension of the gimbal spring along a length thereof is equal to or narrower than the transverse width of the base of the load beam, and the stems of the gimbal arms have a first dimension and the gimbal arms are tapered along at least 25% of the length of the gimbal arms to a second narrower dimension spaced from the stem to provide a stiff gimbal—load beam support interface to limit dimple separation and a smaller gimbal arm dimension along an extended portion of the gimbal arms for gimballing.

11. The in-spring gimbal assembly of claim 10 wherein a width of the gimbal arms is tapered.

12. The in-spring gimbal of claim 10 wherein the load arm includes a vertical offset portion relative to a generally horizontal plane of the load arm along a portion of the length thereof for increased stiffness of the load arm.

13. The in-spring gimbal assembly of claim 10 wherein the load arm includes a raised stepped portion along a portion of the length thereof for increased stiffness for the load arm.

14. The in-spring assembly of claim 10 wherein the thickness of the gimbal arms is smaller than the load arm.

15. The in-spring gimbal assembly of claim 14 including a stepped interface between the load beam and gimbal arms.

16. The in-spring gimbal assembly of claim 10 wherein slider support comprises a mounting tab.

17. A gimbal flexure having an outer profile dimension comprising:
    gimbal arms having extended ends;
    a slider support coupled to extended ends of the gimbal arms; and a mounting stem for attachment to a load beam, a transverse width of the mounting stem is as large as the outer profile dimension of the gimbal flexure and the gimbal arms being integrally formed along the transverse width of the mounting stem, the gimbal arms having a first dimension at the stem and second smaller dimension at a location spaced from the stem to form a taper along at least 25% of the length of the gimbal arms to provide a stiff gimbal—load beam support interface to limit dimple separation between the gimbal arms and mounting and a smaller dimension along an extended portion of the gimbal arms for gimballing.

18. The gimbal flexure of claim 17 wherein a width of the gimbal arms is tapered.

19. The gimbal flexure of claim 17 wherein the slider support includes a slider mounting tab having a narrow neck portion supporting a main portion.

* * * * *